US008874721B1

(12) United States Patent
Mirza et al.

(10) Patent No.: US 8,874,721 B1
(45) Date of Patent: Oct. 28, 2014

(54) SERVICE LAYER SELECTION AND DISPLAY IN A SERVICE NETWORK MONITORING SYSTEM

(75) Inventors: Nasir Mahmood Mirza, Overland Park, KS (US); Sameer Akbar Khan, Overland Park, KS (US); Usman Muhammad Naim, Overland Park, KS (US); Brajendra Singh Thakur, Overland Park, KS (US); Andrew L. Davey, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1556 days.

(21) Appl. No.: 11/769,328

(22) Filed: Jun. 27, 2007

(51) Int. Cl.
*G06F 15/173* (2006.01)
*H04L 12/26* (2006.01)
*H04L 12/24* (2006.01)
*G06F 11/34* (2006.01)

(52) U.S. Cl.
CPC ............ *H04L 12/2602* (2013.01); *H04L 43/04* (2013.01); *H04L 41/22* (2013.01); *G06F 11/3409* (2013.01); *H04L 43/045* (2013.01)
USPC ....................................................... 709/224

(58) Field of Classification Search
CPC ... H04L 12/2602; H04L 43/06; H04L 43/045; G06F 11/3409
USPC ....................................................... 709/226
See application file for complete search history.

(56) References Cited

U.S. PATENT DOCUMENTS

| 5,604,892 | A * | 2/1997 | Nuttall et al. | 703/18 |
| 6,453,268 | B1 * | 9/2002 | Carney et al. | 702/186 |
| 6,490,620 | B1 * | 12/2002 | Ditmer et al. | 709/224 |
| 6,502,131 | B1 * | 12/2002 | Vaid et al. | 709/224 |
| 6,584,504 | B1 * | 6/2003 | Choe | 709/224 |
| 6,831,666 | B1 * | 12/2004 | Kreis | 715/781 |
| 7,257,513 | B2 * | 8/2007 | Lilly | 702/182 |
| 7,716,367 | B1 * | 5/2010 | Leighton et al. | 709/244 |
| 7,823,155 | B2 * | 10/2010 | Misra et al. | 718/104 |
| 7,911,974 | B1 * | 3/2011 | Mirza et al. | 370/254 |
| 8,626,234 | B2 * | 1/2014 | Miller | 455/552.1 |

(Continued)

FOREIGN PATENT DOCUMENTS

WO    WO 2005101947 A2 *  11/2005

OTHER PUBLICATIONS

"PLC Manual—Basic Guide to PLCs." Retrieved from the internet on Aug. 7, 2011. <URL: www.plcmanual.com/isoosi-model>.*

*Primary Examiner* — Larry Donaghue

(57) ABSTRACT

A method of operating a computer system for monitoring a service network that comprises a plurality of systems and that provides a plurality of services, the method comprising displaying a list of the plurality of services, receiving a selection of a first service from the list of the plurality of services, displaying a list of the plurality of layers associated with the first service, receiving a selection of a first layer from the list of the plurality of layers, processing the selection of the first layer to determine a first group of systems, displaying a list of a first group of systems associated with the first service, receiving a selection of a first system from the list of the first group of systems, displaying a graphical representation of the first service, displaying a graphical representation of the first system, monitoring a performance of the first system, and displaying the performance of the first system with the graphical representation of the first system.

13 Claims, 13 Drawing Sheets

(56) References Cited

U.S. PATENT DOCUMENTS

| | | | |
|---|---|---|---|
| 2002/0186238 A1* | 12/2002 | Sylor et al. | 345/736 |
| 2002/0194324 A1* | 12/2002 | Guha | 709/223 |
| 2003/0120764 A1* | 6/2003 | Laye et al. | 709/223 |
| 2003/0126196 A1* | 7/2003 | Lagimonier et al. | 709/203 |
| 2003/0134631 A1* | 7/2003 | Snyder et al. | 455/423 |
| 2003/0225876 A1* | 12/2003 | Oliver et al. | 709/224 |
| 2004/0058651 A1* | 3/2004 | Ross et al. | 455/67.11 |
| 2004/0064552 A1* | 4/2004 | Chong et al. | 709/224 |
| 2004/0249937 A1* | 12/2004 | Tachihara et al. | 709/224 |
| 2005/0021736 A1* | 1/2005 | Carusi et al. | 709/224 |
| 2005/0216585 A1* | 9/2005 | Todorova et al. | 709/224 |
| 2006/0117059 A1* | 6/2006 | Freeman et al. | 707/102 |
| 2007/0150597 A1* | 6/2007 | Hasan et al. | 709/226 |
| 2007/0239873 A1* | 10/2007 | Farhat et al. | 709/224 |
| 2008/0090513 A1* | 4/2008 | Collins et al. | 455/3.01 |
| 2008/0102749 A1* | 5/2008 | Becker | 455/3.06 |

\* cited by examiner

SERVICE LAYER SELECTION AND DISPLAY IN A SERVICE NETWORK MONITORING SYSTEM

BACKGROUND OF THE INVENTION

1. Field of the Invention

The invention is related to the field of communications, and in particular, to systems, methods, and software for monitoring service networks.

2. Description of the Prior Art

Communication service providers commonly offer many different types of communication services to their customers, such as voice, video, and data services. The services are typically provided over a service network that consists of a wide variety of systems. Some systems are utilized by several services simultaneously. Other systems are only utilized by a single service. For example, a voice service and a music download service may both require a base station in order to deliver each service to a mobile user. In contrast, the music download service may require a music server, whereas the voice service would not.

Network monitoring systems are well known in the prior art. Most monitoring systems display a service network and the systems that belong to the service network in a graphical manner. The monitoring systems receive performance information from the systems and display the performance information for the systems accordingly. For example, the monitoring systems generate and display alarms when the performance information indicates the failure of or other such performance problem with a system.

Present network monitoring systems allow a user to select which systems in a service network should be monitored. For instance, one particular system used to deliver a music download service may be of interest to the user. The user can select that system for monitoring. However, users often times may not know which systems are used to provide a particular service. Yet, present network monitoring systems assume that a user has a detailed knowledge of which systems are used by each service. In such cases, a user must resort to trial and error in order to select the appropriate system to monitor.

SUMMARY OF THE INVENTION

Embodiments of the invention provide systems, methods, and software that allow a user to select a service from multiple services provided by a service network. The user is then provided with multiple systems associated with the selected service. The user can select one or more of the systems for monitoring. The selected systems are displayed in a graphical manner to the user, along with the performance information related to each system. In this manner, the user is able to quickly and efficiently monitor a system of interest to the user.

In an embodiment, a computer system is provided for monitoring a service network. The service network comprises a plurality of systems. The service network utilizes the systems to provide a plurality of services. The computer system displays a list of the services to a user. The computer system receives from the user a first selection of a first service from the list of the plurality of services. The computer system displays a list of a first group of systems associated with the selected service to the user. The computer system receives a selection of a first system from the list of the first group of systems and displays a graphical representation of the first service. The computer system also displays a graphical representation of the first system. The computer system monitors the performance of the first system and displays the performance of the first system with the graphical representation of the first system.

DETAILED DESCRIPTION OF THE PREFERRED EMBODIMENT

FIGS. 1-13B and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments of the invention. As a result, the invention is not limited to the specific embodiments described below, but only by the claims and their equivalents.

Figure 1:
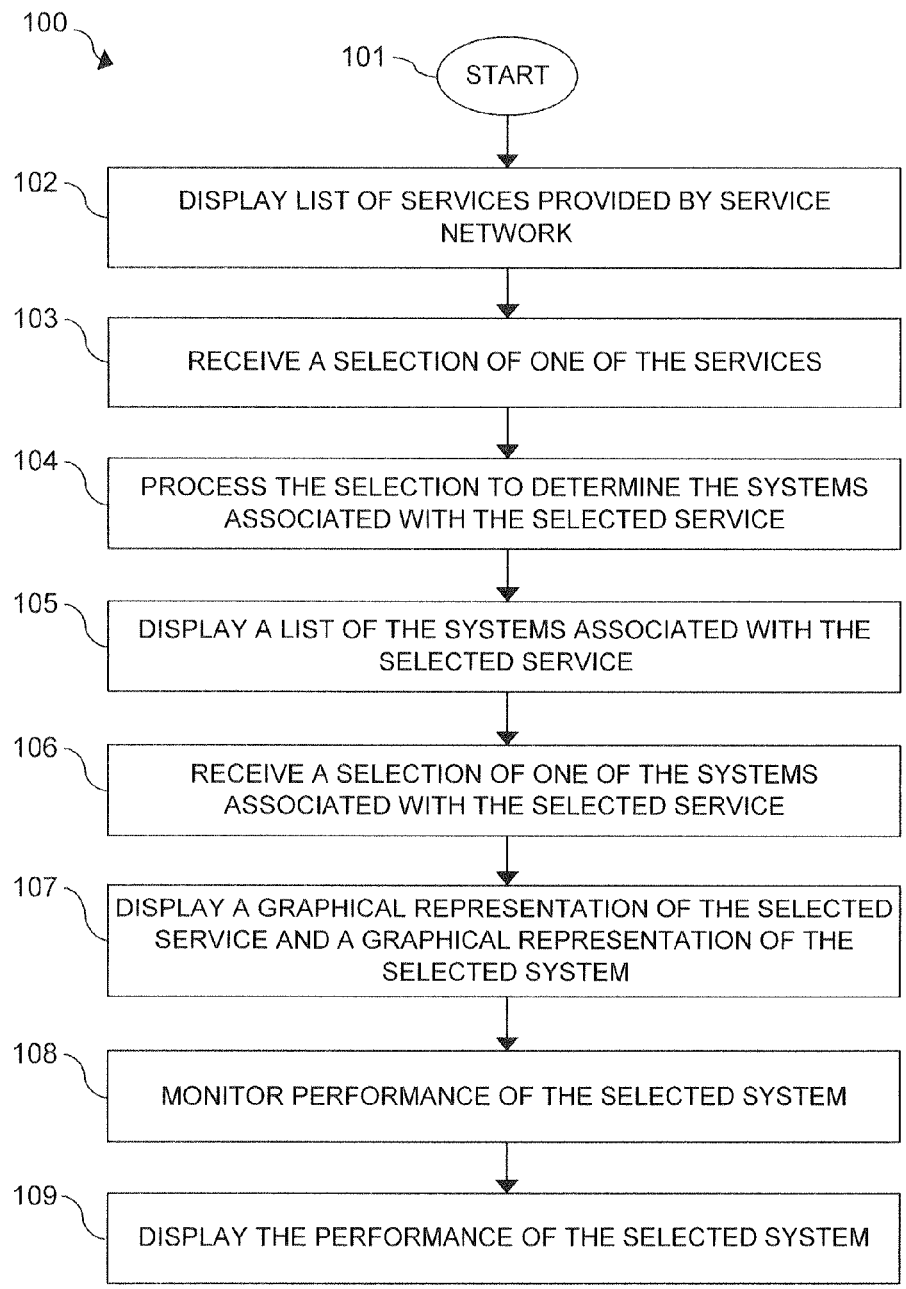
FIG. 1 illustrates a process in an embodiment of the invention.

FIG. 1 illustrates a process 100 in an embodiment. In this embodiment, a user may be desire to monitor a system or systems involved in the provisioning and delivery of a communication service in a service network. In this embodiment, the user is allowed to select which service is of interest to the user. A group of systems associated with the service is automatically determined and displayed to the user. The user can select at least one of the systems associated with the service to be monitored. A graphical representation of the service and the selected system is generated and displayed to the user. The performance of the system is also monitored and displayed to the user.

Referring to FIG. 1, process 100 starts at Step 101. At Step 102, the computer system displays a list of services provided by the service network. At Step 103, the computer system receives a user selection of one of the services from the list. At Step 104, the computer system processes the selection to determine systems in the service network associated with the selected service. At Step 105, the computer system displays a list of the systems determined to be associated with the selected service. At Step 106, the computer system receives a user selection of one of the systems associated with the selected service. At Step 107, the computer system displays a graphical representation of the selected service and a graphical representation of the selected system. At Step 108, the computer system monitors the performance of the selected system. For instance, the computer system communicates with the service network, or elements within the service network, to determine the performance of the selected system. At step 109, the computer system displays the performance of the selected system.

Advantageously, process 100 allows a user to select a service for which the user may desire to monitor a system. Process 100 automatically provides a list of systems associated with the selected service to the user. The user is able to select a system from the list of systems. The system is then monitored and the performance of the system is displayed to the user.

Figure 2:
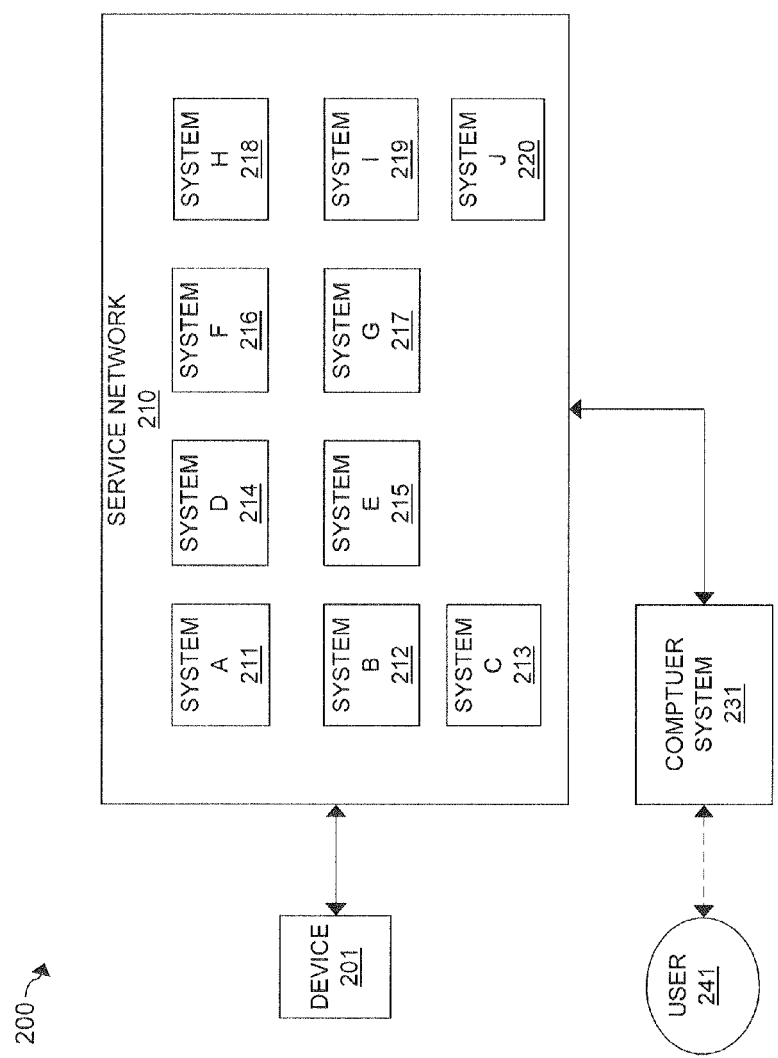
FIG. 2 illustrates a communication network in an embodiment of the invention.

FIG. 2 illustrates communication network 200 in an embodiment. Communication network 200 includes device 201, service network 210, and computer system 231. Service network 210 communicates with device 201. Service network 210 is any network or collection of networks capable of providing multiple services to device 201. Device 201 is any device or system capable of communicating with service network 210, such as a mobile phone, a personal computer, a personal digital assistant, a personal music or video device, or other type of device. Device 201 is operated by a user (not shown). Computer system 213 is any system or collection of systems capable of communicating with service network 210. Computer system 231 is operated by user 241.

Service network 210 includes multiple systems A 211, B 212, C 213, D 214, E 215, F 216, G 217, H 218, I 219, and J 220. The multiple systems in service network 210 operate to provide the multiple services to device 201. Each system provides a particular function that may be required of at least one of the services.

Figure 3:
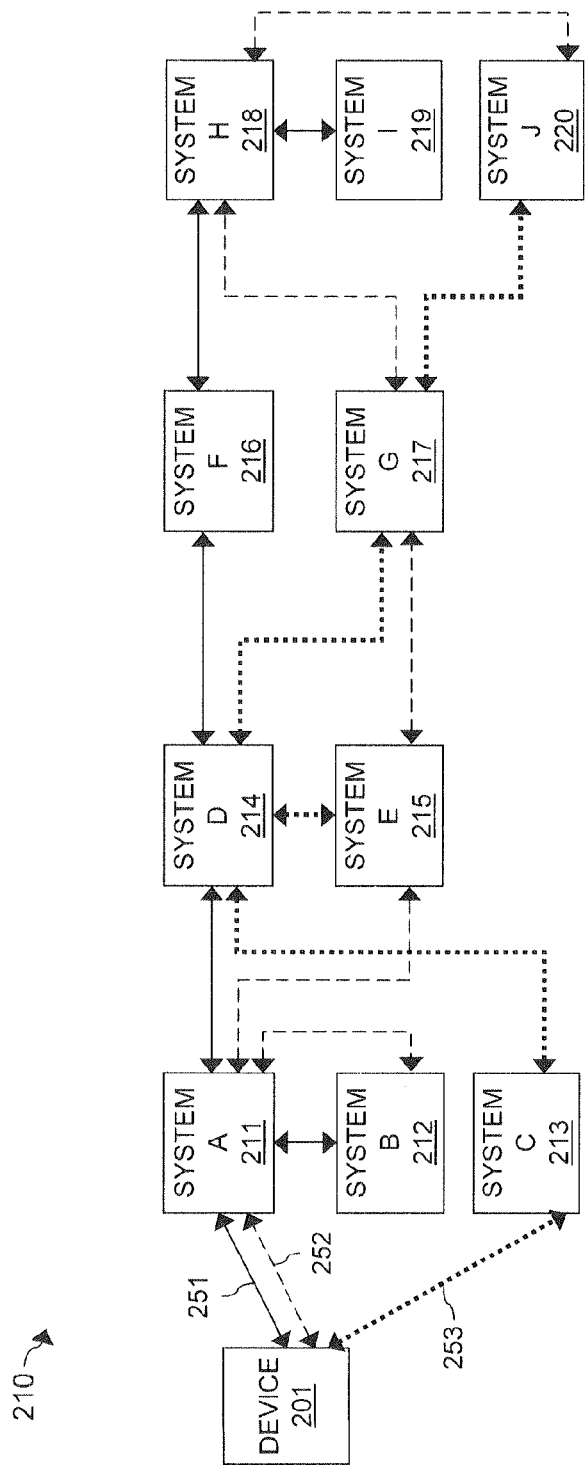
FIG. 3 illustrates a service network in an embodiment of the invention.

FIG. 3 shows service network 210 in more detail. In particular, FIG. 3 illustrates three services 251, 252, and 253 provided by service network 210. FIG. 3 also shows which systems are used for each service 251, 252, and 253.

In FIG. 3, service 251 is shown by a solid line. Service network 210 employs system A 211, system B 212, system D 214, system F 216, system H 218, and system I 219 to provide service 251.

Service 252 is shown by a dashed line. Service network 210 employs system A 211, system B 212, system E 215, system G 217, system H 218, and system J 220 to provide service 252.

Service 253 is shown by a dotted line. Service network 210 employs system C 213, system D 214, system G 217, and system J 220 to provide service 253.

Figure 4:
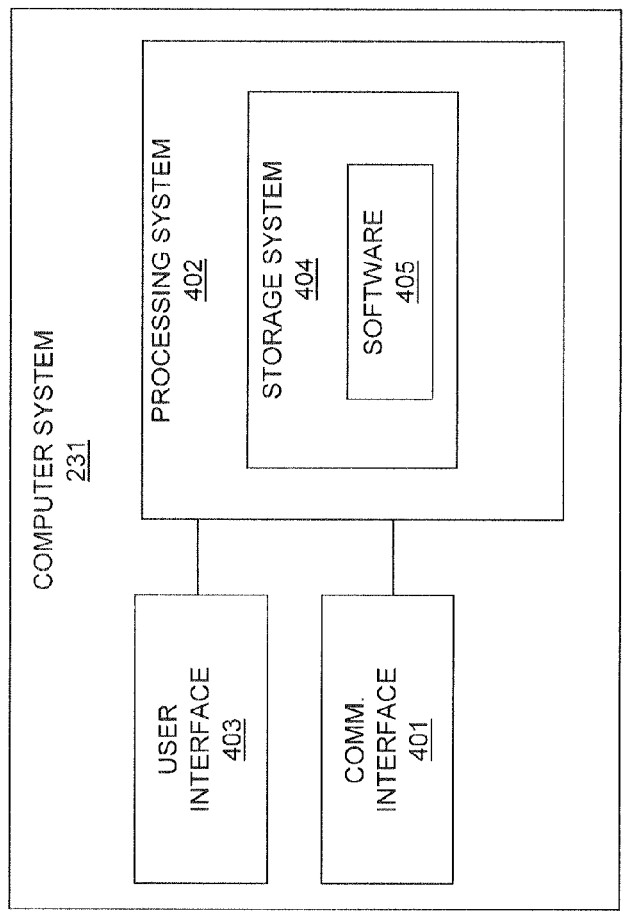
FIG. 4 illustrates a computer system in an embodiment of the invention.

FIG. 4 illustrates a computer system 231. Computer system 231 includes communication interface 401, processing system 402, and user interface 403. Processing system 402 includes storage system 404. Storage system 404 stores software 405. Processing system 402 is linked to communication interface 401 and user interface 403. Computer system 231 could be comprised of a programmed general-purpose computer, although those skilled in the art will appreciate that programmable or special purpose circuitry and equipment may be used. Computer system 231 may be distributed among multiples devices that together comprise elements 401-405.

Communication interface 401 could comprise a network interface, modem, port, transceiver, or some other communication device. Communication interface 401 may be distributed among multiple communication devices. Processing system 402 could comprise a computer microprocessor, logic circuit, or some other processing device. Processing system 402 may be distributed among multiple processing devices. User interface 403 could comprise a keyboard, mouse, voice recognition interface, microphone and speakers, graphical display, touch screen, or some other type of user device. User interface 403 may be distributed among multiple user devices. Storage system 404 could comprise a disk, tape, integrated circuit, server, or some other memory device. Storage system 404 may be distributed among multiple memory devices.

Processing system 402 retrieves and executes software 405 from storage system 404. Software 405 may comprise an operating system, utilities, drivers, networking software, and other software typically loaded onto a computer system. Software 405 could comprise an application program, firmware, or some other form of machine-readable processing instructions. When executed by processing system 402, software 405 directs processing system 402 to operate as described herein for computer system 231.

Figure 5:
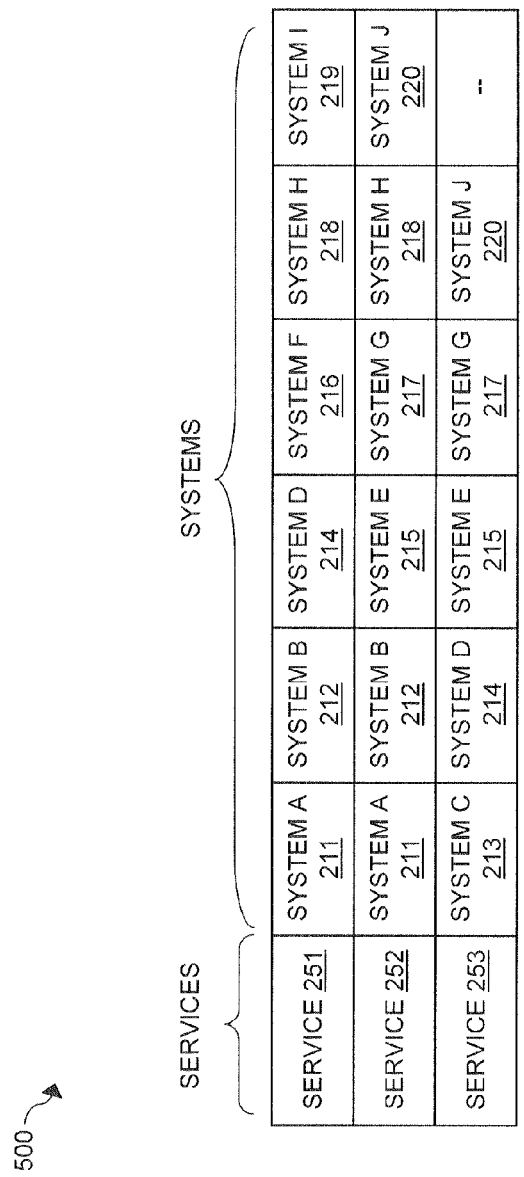
FIG. 5 illustrates a data structure in an embodiment of the invention.

FIG. 5 illustrates a data structure 500. Data structure 500 stores the identity of each service 251, 252, and 253 in association with each system associated with each service. In FIG. 5, service 251 is shown as associated with system A 211, system B 212, system D 214, system F 216, system H 218, and system I 219. Service 252 is shown as associated with system A 211, system B 212, system E 215, system G 217, system H 218, and system J 220. Service 253 is shown as associated with system C 213, system D 214, system E 215, system G 217, and system J 220. Computer system 231 stores and processes data structure 500.

Figure 6A:
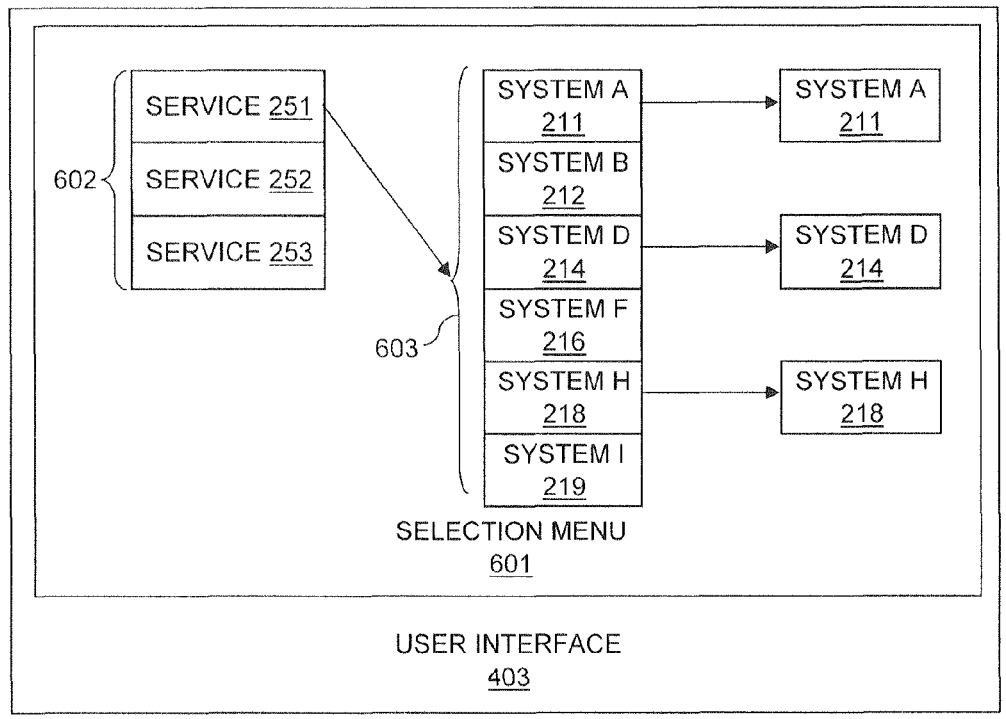
FIGS. 6A-B illustrate a user interface in embodiments of the invention.

Referring to FIG. 6A, user 241 may desire to monitor a system or systems involved in the provisioning and delivery of one of the services 251, 252, and 253 in service network 210. Computer system 231 displays selection menu 601 to user 241. Selection menu 601 is displayed by user interface 403. Selection menu 601 includes a list 602 of services provided by service network 210. The list 602 identifies services 251, 252, and 253. User 241 views and selects one of the services from the list 602 of services. In this example, user 241 selects service 251.

In response to the selection of service 251 by user 241, computer system 231 processes data structure 500 to determine which systems are associated with service 251. As shown in data structure 500, and as determined by computer system 231, system A 211, system B 212, system D 214, system F 216, system H 218, and system I 219 are associated with service 251. Computer system 231 responsively displays another list 603 of the systems associated with service 251. As shown, the list 603 includes system A 211, system B 212, system D 214, system F 216, system H 218, and system I 219.

Figure 6B:
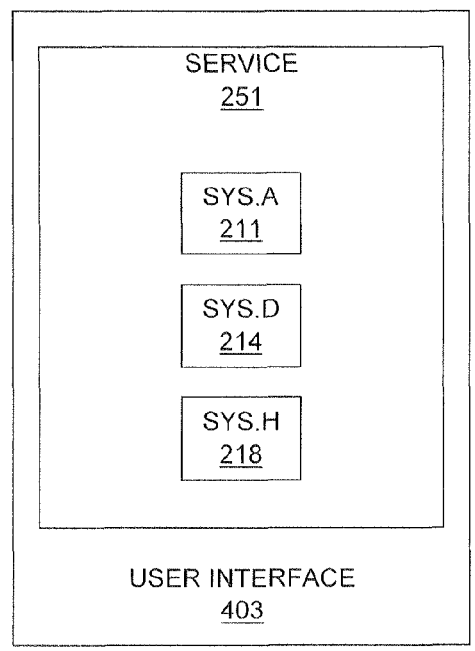

User 241 views the list 603 of the systems associated with service 251 and selects one or more systems from the list 603 for performance monitoring. In this example, user 241 selects system A 211, system D 214, and system H 218. As shown in FIG. 6B, in response to the user selections computer system 231 processes the user selections to generate and display on user interface 403 a graphical representation of service 251 and graphical representations of system A 211, system D 214, and system H 218.

Figure 7A:
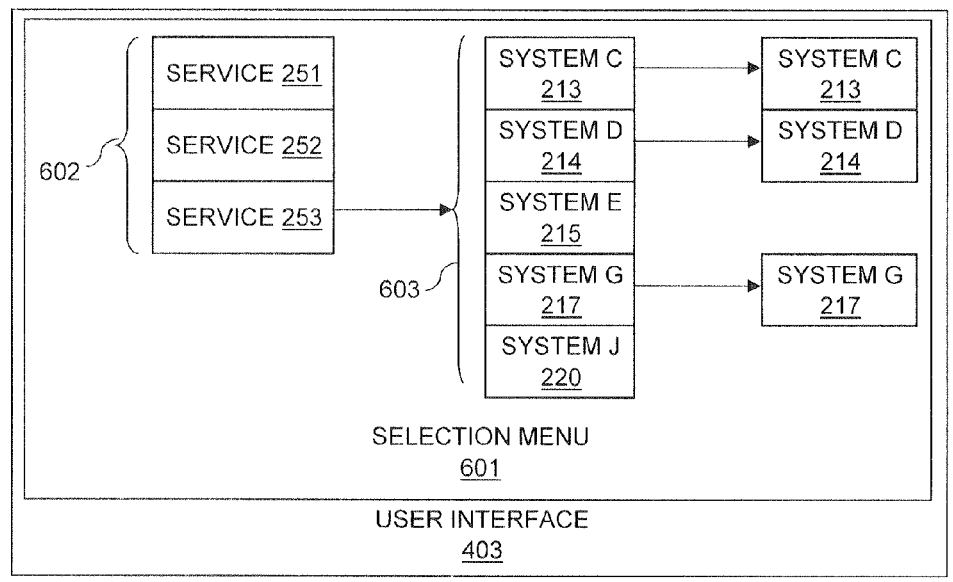
FIGS. 7A-C illustrate a user interface in embodiments of the invention.
Figure 7B:
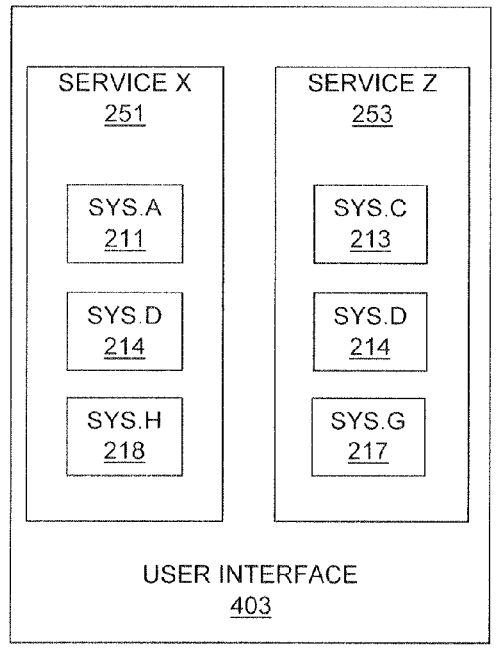

Upon receiving the selection of systems for service 251, computer system 231 may be directed by user 241 to return to graphical user interface 601, as shown again in FIG. 7A. User 241 views the services in list 602 and selects one of the services. However, in this instance user 241 selects service 253. In response to the selection, computer system 231 processes data structure 500 to determine which systems are associated with service 251. As shown in data structure 500, system C 213, system D 214, system E 215, system G 217, and system J 220 are associated with service 253. Computer system 231 displays the associated systems in list 603. Note that list 603 in FIG. 7A identifies different systems than list 603 in FIG. 6A.

User 241 views the list 603 of the systems associated with service 253 and selects one or more of the systems from the 603 for performance monitoring. In this example, user 241 selects system C 213, system D 214, and system G 217. As further shown in FIG. 7B, in response to the user selections computer system 231 processes the user selections to generate and display on user interface 403 a graphical representation of service 251 and graphical representations of system A 211, system D 214, and system H 218. User interface 403 also displays a graphical representation of service 253, system C 213, system D 214, and system G 217.

Figure 7C:
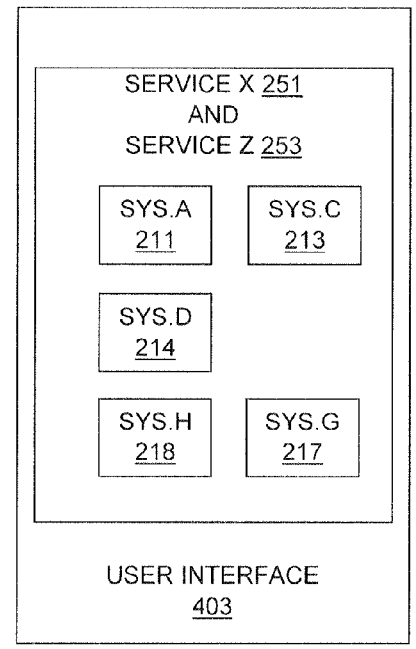

FIG. 7C illustrates an alternative whereby a single graphical representation is displayed representing both service 251 and service 253. In addition, duplicate systems are displayed only once. In particular, user interface 403 displays only one graphical representation of system D 214, which is involved in both service 251 and service 253. Computer system 231 could process both sets of system selections by user 241 to determine if any of the systems are duplicates. If so, computer system 231 can display the system only once.

In operation, computer system 231 communicates with service network 210 to monitor the performance of the systems selected by user 241. In the example above, computer system 231 transmits requests to service network 210 for performance information related to system A 211, system D 214, and system H 218. In one example, computer system 231 communicates with a performance monitoring system within service network 210, such as a network operations center (N.O.C), to obtain the performance information. In another example, computer system 231 communicates directly with system A 211, system D 214, and system H 218 to obtain the performance information. In yet another example, computer system 231 could communicate with some other performance database that stores the performance information. The performance information could comprise status updates, alerts, alarms, and other well known performance data that indicate the performance of each system.

Upon receiving the performance information, computer system 231 displays the performance information for each system. For instance, the format of each graphical representation of a service or a system could correspond to the performance of the service or system. The format could include the color, font, shape, or size of each graphical representation. For example, a green color could correspond to normal performance. A yellow color could correspond to reduced performance. A red color could correspond to alarms or alerts. In another example, a text box could be displayed along with the graphical representation of each service or system. The text box could display the performance information for each service or system, such as whether the service or system is performing at a normal level, a reduced level, or at an alert level. Other methods for displaying the performance information are possible.

Figure 8:
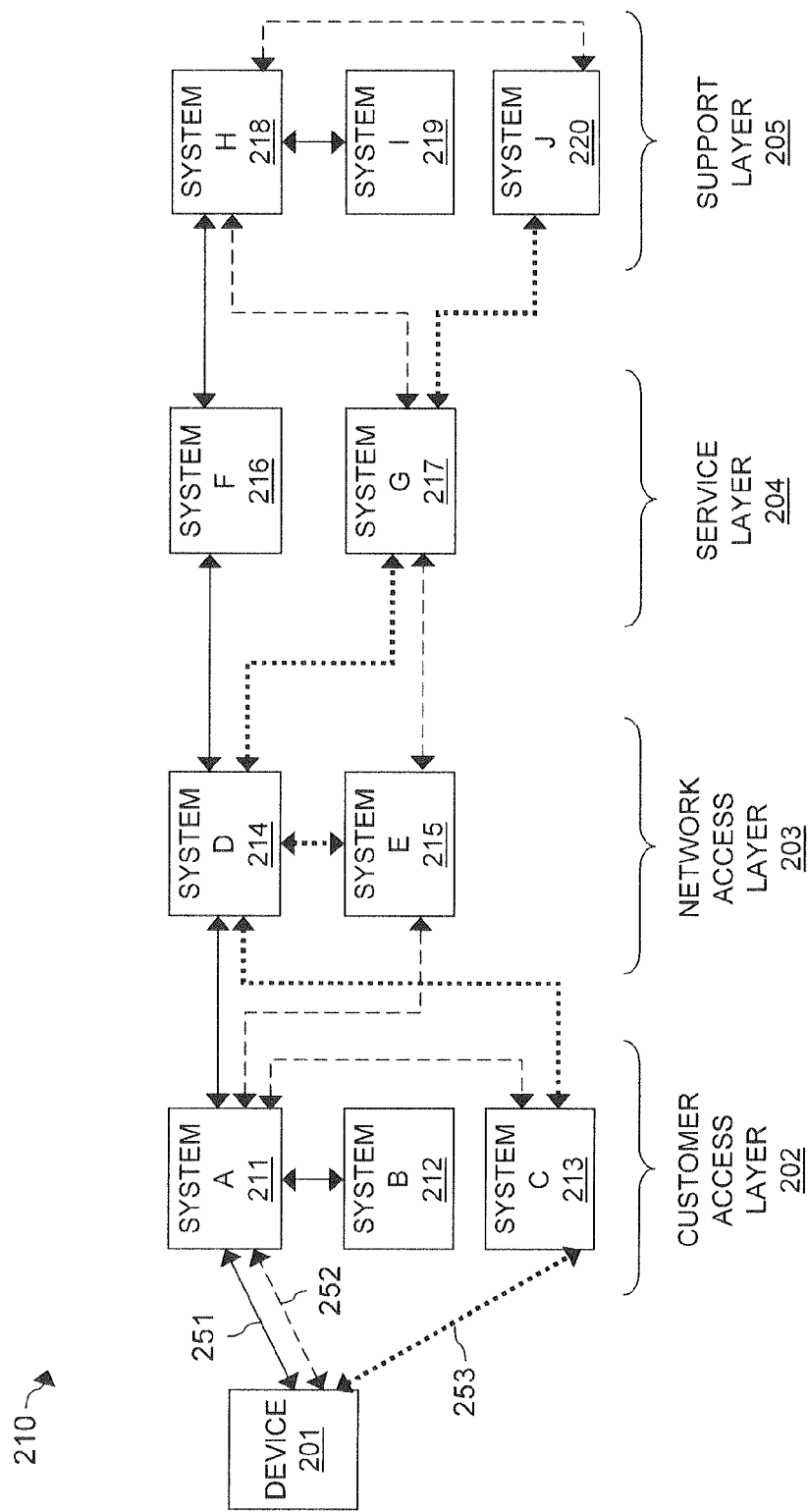
FIG. 8 illustrates a service network in an embodiment of the invention.

In another embodiment, FIG. 8 illustrates service network 210 in yet more detail. In particular, FIG. 8 illustrates which systems of service network 210 are used by service network 210 to provide each service 251, 252, and 253. As further shown in FIG. 8, service network 210 could be considered to have several layers. The several layers could be custom defined by a user, a group, or an enterprise. The several layers could also be industry standards. Each system included in service network 210 is associated with one of the layers. FIG. 8 also illustrates the several layers by which each system can be categorized.

In FIG. 8, service network 210 includes customer access layer 202, network access layer 203, service layer 204, and support layer 205. Customer access layer 202 includes system A 211, system B 212, and system C 213. Network access layer 203 includes system D 214 and system E 215. Service layer 204 includes system F 216 and system G 217. Support layer 205 includes system H 218, system I 219, and system J 220.

As further shown in FIG. 8, the relationship between each system in service network 210 used to provide service 251 is shown. Device 201 communicates with system A 211 in customer access layer 202 in order to obtain access to network access layer 203, and in particular, to system D 214. System A 211 also communicates with system B 212 to facilitate access for device 201 to network access layer 203. Device 201 communicates with system D 214 via system A 211. System D 214 provides device 201 with access to service layer 204, and in particular, to system F 216. System F 216 provides the service to device 201 via system D 214 and system A 211. System F 216 also communicates with system H 218 in support layer 205 to support the service. System H 218 further communicates with system I 219 to support the service.

Further in FIG. 8, the relationship between each system in service network 210 used to provide service 252 is shown. Device 201 communicates with system A 211 in customer access layer 202 in order to obtain access to network access layer 203, and in particular, to system E 215. System A 211 further communicates with system C 213 and system E 215 to facilitate the access. Device 201 communicates with system E 215 via system A 211. System E 215 provides device 201 with access to service layer 204, and in particular, to system G 217. System G 217 provides the service to device 201 via system E 215 and system A 211. System G 217 also communicates with system H 218 in support layer 205 to support the service. System H 218 further communicates with system J 220 to support the service.

FIG. 8 also illustrates the relationship between each system in service network 210 utilized to provide service 253. Device 201 communicates with system C 213 in customer access layer 202 in order to obtain access to network access layer 203, and in particular, to system D 214. System D 214 provides device 201 with access to service layer 204, and in particular, to system G 217. System D 214 further communicates with system E 215 in order to provide device 201 with the access to system G 217. System G 217 provides the service to device 101 via system D 114 and system C113. System G 217 further communicates with system J 220 in support layer 205 to support service 253.

Figure 9:
FIG. 9 illustrates a data structure in an embodiment of the invention.

In FIG. 9, a data structure 900 describes the services provided by service network 210, the layers of service network 210, and each system included in service network 210. The identity of each system is stored in association with one of the services and one of the layers. Computer system 231 stores data structure 900.

As shown, service 251 is associated with system A 211, system B 212, system D 214, system F 215, system H 218, and system I 219. Service 252 is associated with system A 211, system B 212, system E 215, system G 217, system H 218, and system J 220. Service 253 is associated with system C 213, system D 214, system E 215, system G 217, and system J 220. In addition, customer access layer 202 is associated with system A 211, system B 212, and system C 213. Network access layer 203 is associated with system D 214 and system E 215. Service layer 204 is associated with system F 216 and system G 217. Support layer 205 is associated with system H 218, system I 219, and system J 220.

Figure 10A:
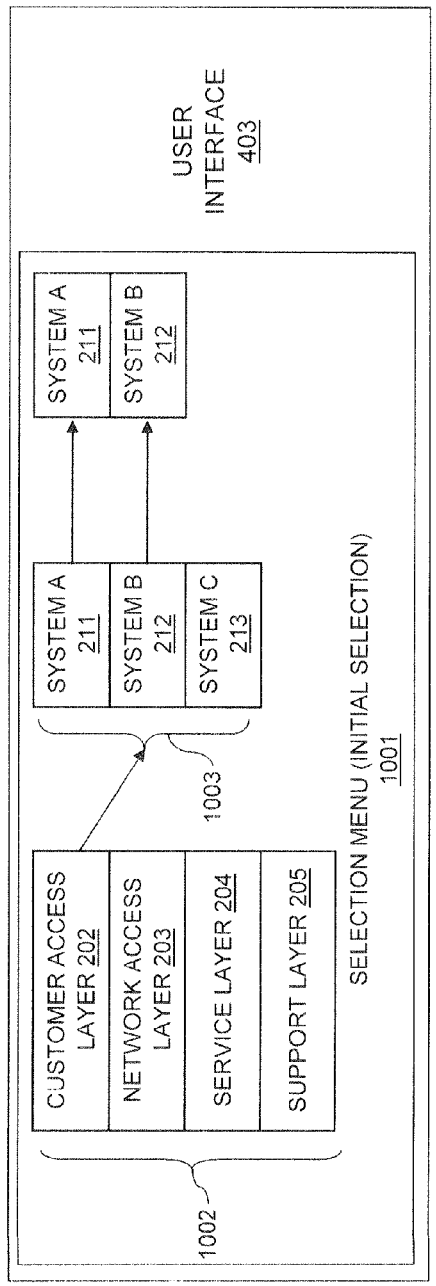
FIGS. 10A-B illustrate a user interface in embodiments of the invention.
Figure 10B:
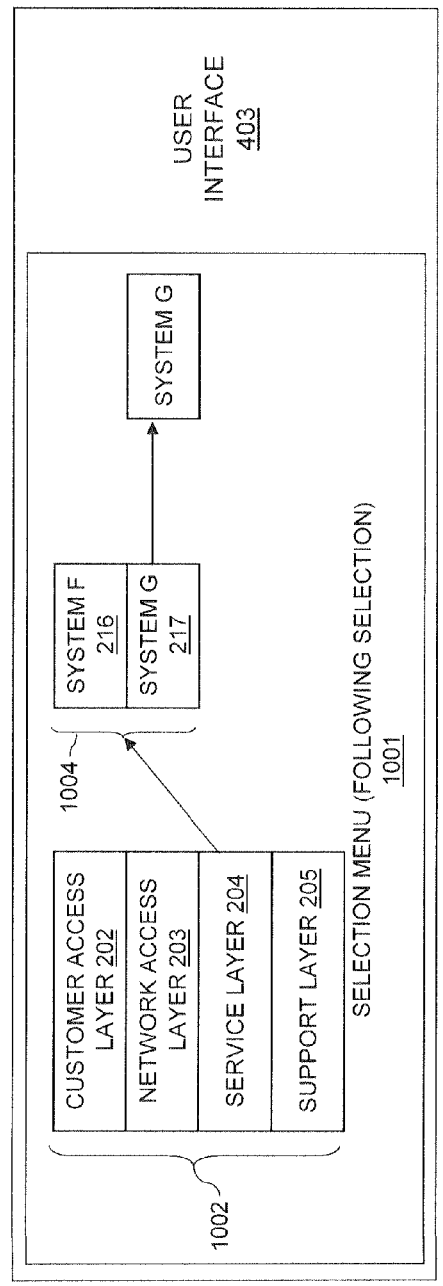

In one example, FIG. 10A and FIG. 10B illustrates two instances of a selection menu 1001 displayed by user interface 403. In the first instance of selection menu 1001, user 241 makes an initial selection of systems for monitoring. In the second instance of selection menu 1201 following the initial selection, user 241 makes an additional selection of systems for monitoring.

In operation, computer system 231 displays selection menu 1001 to user 241 for user 241 to make an initial selection of systems for monitoring. As shown in FIG. 10A, selection menu 1001 includes a list 1002 of services provided by service network 210. The list 1002 identifies customer access layer 202, network access layer 203, service layer 204, and support layer 205. User 241 views and selects one of the layers from the list 1002 of services. In this example, user 241 selects customer access layer 202.

In response to the selection of customer access layer 202 by user 241, computer system 231 processes data structure 900 to determine which systems are associated with customer access layer 202. As shown in data structure 900, and as determined by computer system 231, system A 211, system B 212, and system C 213 are associated with customer access layer 202. Computer system 231 responsively displays another list 1003 of the systems associated with customer access layer 202. As shown, the list 1003 includes system A 211, system B 212, and system C 213.

User 241 views the list 1003 of the systems associated with customer access layer 202 and selects one or more systems from the list 1003 for performance monitoring. In this example, user 241 selects system A 211 and system B 212.

Upon receiving the initial selection of systems for customer access layer 202, computer system 231 may be directed by user 241 to return to the start of selection menu 1001 following the initial selection to select additional systems for monitoring, as shown in FIG. 10B. User 241 views the layers in list 1002 and selects one of the layers. In this example, user 241 selects service layer 204. In response to the selection, computer system 231 processes data structure 900 to determine which systems are associated with service layer 204. As shown in data structure 900, system F 216 and system G 217 are associated with service layer 204. Computer system 231 displays the associated systems in list 1004.

Figure 11:
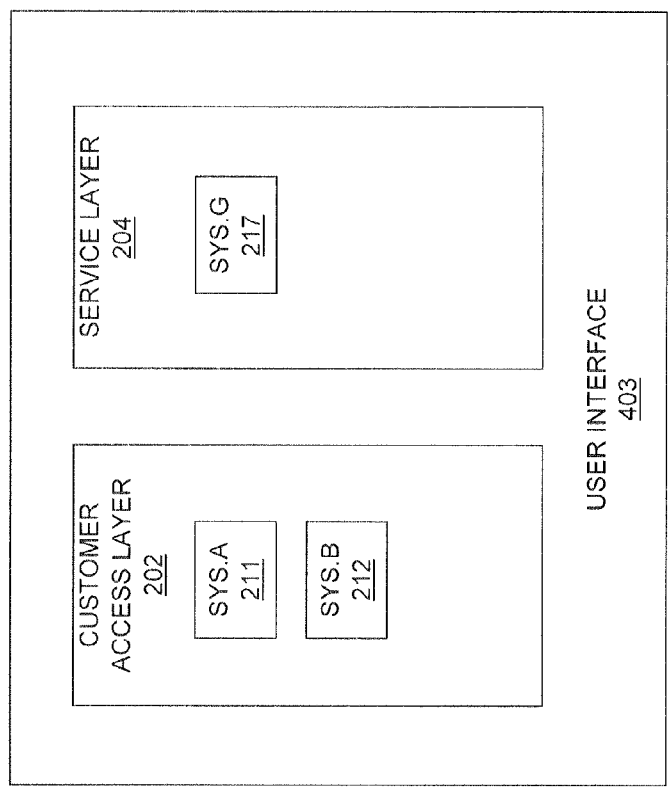
FIG. 11 illustrates a user interface in an embodiment of the invention.

User 241 views the list 1004 of the systems associated with service layer 204 and selects one or more of the systems from the list 1004 for performance monitoring. In this example, user 241 selects system G 217. As shown in FIG. 11, in response to the user selections computer system 231 processes the user selections to generate and display on user interface 403 a graphical representation of customer access layer 202 and graphical representations of system A 211 and system B 212. User interface 403 also displays a graphical representation of service layer 204 and a graphical representation of system G 217.

In operation, computer system 231 communicates with service network 210 to monitor the performance of system A 211, system B 212, and system G 217. Computer system 231 communicates with a performance monitoring system within service network 210, such as a network operations center (N.O.C), to obtain the performance information. Optionally, computer system 231 communicates directly with system A 211, system B 212, and system G 217 to obtain the performance information. In yet another example, computer system 231 could communicate with some other performance database that stores the performance information. Upon receiving the performance information, computer system 231 displays the performance information for each system.

Figure 12A:
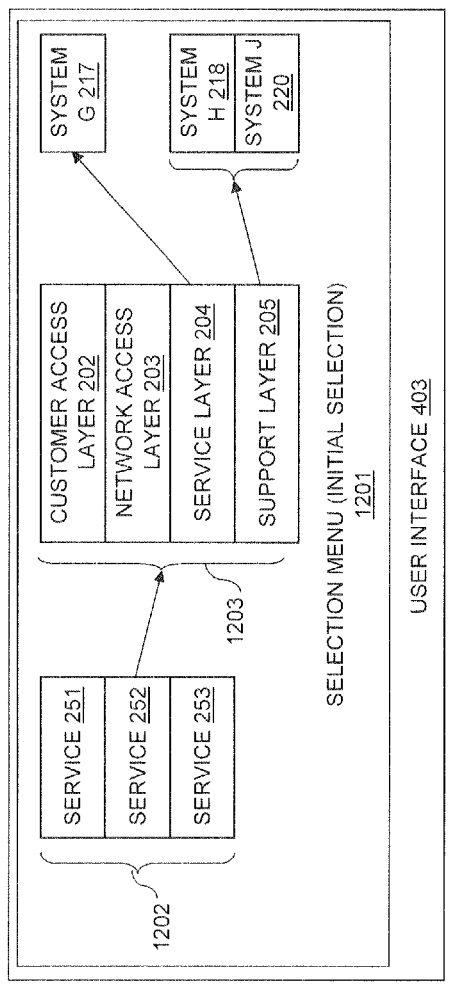
FIGS. 12A-B illustrate a user interface in embodiments of the invention.
Figure 12B:
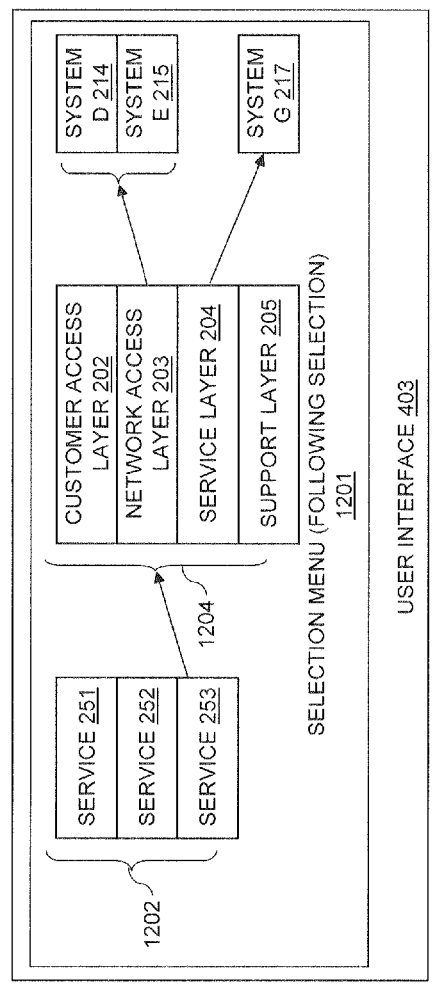

In another example, FIGS. 12A and 12B illustrates two instances of selection menu 1201 displayed by user interface 403. In the first instance of selection menu 1201, user 241 makes an initial selection of systems for monitoring. In the second instance of selection menu 1201 following the initial selection, user 241 makes another selection of systems to monitor after having made the initial selection.

Referring to FIG. 12A, the first instance of selection menu 1201 includes list 1202. List 1202 lists the services 251, 252, and 253 provided by service network 210. User 241 selects one of the services from list 1202. In this example, user 241 selects service 252.

In response to the selection, computer system 231 processes data structure 900 to determine which layers of service network 210 are associated with service 252. In this example, computer system 231 determines that customer access layer 202, network access layer 203, service layer 204, and support layer 205 are associated with service 252. Computer system 231 displays in list 1203 the layers associated with service 252. User 241 views the list and selects one or more of the layers for monitoring. In this example, user 241 selects service layer 204 and support layer 205.

In response to this selection, computer system 231 processes data structure 900 to determine which systems are associated with both service layer 204 and service 252. In this example, system G 217 is the only system associated with both service layer 204 and service 252. In addition, computer system 231 processes data structure 900 to determine which systems are associated with both support layer 205 and service 252. In this example, system H 218 and system J 220 are associated with both service layer 204 and service 252.

Figure 13A:
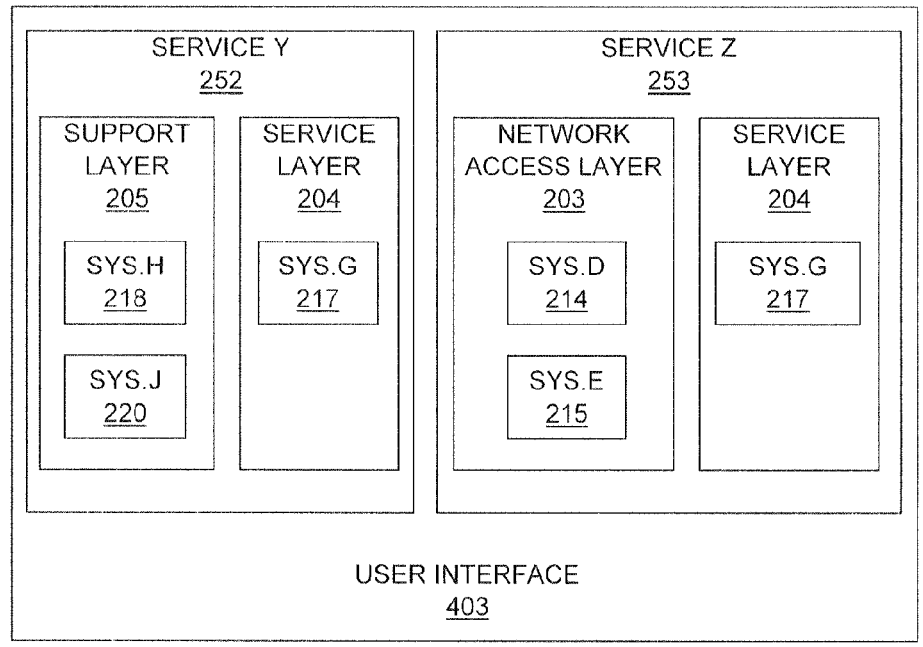
FIGS. 13A-B illustrate a user interface in embodiments of the invention.

As shown in FIG. 13A, upon determining which systems to monitor for service 252, computer system 231 generates and displays on user interface 403 a graphical representation of service 252, a graphical representation of support layer 205, and a graphical representation of service layer 204. User interface 403 also displays graphical representations of system H 218 and system J 220 with the graphical representation of support layer 205 and the graphical representation of service 252. In addition, user interface 403 displays a graphical representation of system G 217 with the graphical representation of service layer 204 and the graphical representation of service 252.

After the initial selection of systems, user 241 may return to list 1202 to make a following selection of an addition service, as shown in FIG. 12B. In this example, user 241 selects service 253. Computer system 231 processes data structure 900 to determine which layers of service network 210 are associated with service 253. In this example, computer system 231 determines that customer access layer 202, network access layer 203, service layer 204, and support layer 205 are associated with service 253. Computer system 231 displays in list 1204 the layers associated with service 253. User 241 views the list and selects one or more of the layers for monitoring. In this example, user 241 selects network access layer 203 and service layer 204.

In response to this selection, computer system 231 processes data structure 900 to determine which systems are associated with both network access layer 203 and service 253, and with both service 253 and service layer 204. In this example, system D 214 and system E 215 are associated with both service 253 and network access layer 203. System G 217 is associated with service 253 and service layer 204.

As further shown in FIG. 13A, upon determining which systems to monitor for service 253, network access layer 203, and service layer 204, computer system 231 generates and displays on user interface 403 a graphical representation of service 253, a graphical representation of network access layer 203, and another graphical representation of service layer 204. User interface 403 also displays graphical representations of system D 214 and system E 215 with the graphical representation of network access layer 203 and the graphical representation of service 253. In addition, user interface 403 displays a graphical representation of system G 217 with the graphical representation of service layer 204 and the graphical representation of service 253.

Figure 13B:
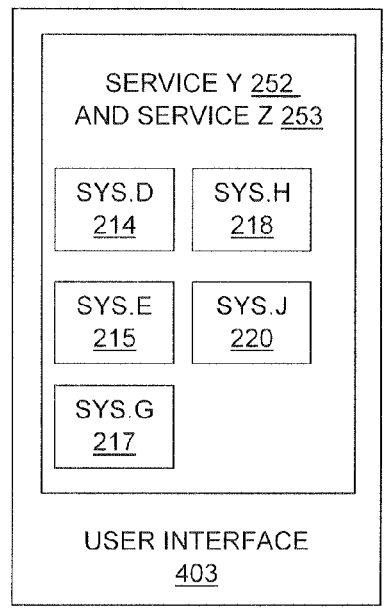

FIG. 13B illustrates an alternative where user interface 403 displays a single graphical representation representing both service 252 and service 253. In addition, duplicate systems are displayed only once. In particular, system G 217, which is involved in both service 252 and service 253, is displayed only once by user interface 403. In contrast, system G 217 is displayed twice by user interface 403. Computer system 231 could process both sets of systems for each service 252 and 253 to determine if any of the systems are duplicates. If so, computer system 231 can display the system only once.

In operation, computer system 231 communicates with service network 210 to monitor the performance of system D 214, system E 215, system G 217, H 218, and system J 220. Computer system 231 communicates with a performance monitoring system within service network 210, such as a network operations center (N.O.C), to obtain the performance information. Optionally, computer system 231 communicates directly with system D 214, system E 215, system G 217, H 218, and system J 220 to obtain the performance information. In yet another example, computer system 231 could communicate with some other performance database that stores the performance information. Upon receiving the performance information, computer system 231 displays the performance information for each system.

Advantageously, embodiments described above allow a user to monitor systems of interest in a service network without first requiring detailed knowledge of the service network. A user is provided a menu driven selection interface from which the user selects a service of interest. In response, the user is presented with a list of systems associated with the selected service. The user can then select one or more of the systems for monitoring. The selected systems are displayed in a graphical manner to the user, along with the performance information related to each system. In this manner, the user is able to quickly and efficiently monitor a system or systems of interest to the user.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computer system for monitoring a service network having a plurality of layers to provide a plurality of communication services to customers, wherein the service network comprises a plurality of systems and each system of the plurality of systems is associated with one layer of the plurality of layers, the method comprising:
    displaying a list of the plurality of communication services provided to the customers;
    receiving a selection of a first service from the list of the plurality of communication services;
    responsive to receiving the selection of the first service, processing the selection of the first service to determine which of the plurality of layers are associated with the first service;
    displaying a list of the plurality of layers associated with the first service;
    receiving a selection of a first layer from the list of the plurality of layers associated with the first service;
    receiving a selection of a second layer from the list of the plurality of layers associated with the first service;
    processing the selections of the first and second layers to determine a first group of systems of the plurality of systems, wherein the first group of systems are associated with the first and second layers and support the first service at both the first and second layers;
    displaying a list of the first group of systems associated with the first service;
    receiving a selection of a first system from the list of the first group of systems and a selection of a second system from the list of the first group of systems;
    displaying a graphical representation of the first service;
    displaying a graphical representation of the first system and a graphical representation of the second system;
    monitoring a performance of the first system and a performance of the second system;
    displaying the performance of the first system with the graphical representation of the first system and the performance of the second system with the graphical representation of the second system;
    receiving a selection of a second service from the list of the plurality of communication services;
    displaying a list of a second group of systems associated with the second service;
    receiving a selection of a third system from the list of the second group of systems;
    displaying a graphical representation of the second service;
    displaying a graphical representation of the third system;
    monitoring a performance of the third system; and
    displaying the performance of the third system with the graphical representation of the third system.

2. The method of claim 1 wherein displaying the list of the first group of systems associated with the first service comprises displaying the list of the first group of systems associated with the first service in response to receiving the selection of the first service from the list of the plurality of communication services.

3. The method of claim 1 wherein processing the selection of the first service to determine which of the plurality of layers are associated with the first service comprises processing a data structure that describes the communication services, the plurality of layers, and the plurality of systems.

4. The method of claim 1 wherein the plurality of layers comprises a customer access layer, a network access layer, a service layer, and a support layer.

5. The method of claim 1 wherein displaying the list of the first group of systems associated with the first service comprises displaying the list of the first group of systems associated with the first service in response to receiving the selection of the first layer from the list of the plurality of layers.

6. The method of claim 1 wherein the plurality of communication services comprise a voice service, a video service, and a data service.

7. A software product for operating a computer system to monitor a service network having a plurality of layers to provide a plurality of communication services to customers, wherein the service network comprises a plurality of systems and each system of the plurality of systems is associated with one layer of the plurality of layers, the software product comprising:

a storage medium having stored thereon instructions that, when executed by the computer system, direct the computer system to display a list of the plurality of communication services provided to the customers, receive a selection of a first service from the list of the plurality of communication services, responsive to receiving the selection of the first service, process the selection of the first service to determine which of the plurality of layers are associated with the first service, display a list of the plurality of layers associated with the first service, receive a selection of a first layer from the list of the plurality of layers associated with the first service, receive a selection of a second layer from the list of the plurality of layers associated with the first service, process the selections of the first and second layers to determine a first group of systems of the plurality of systems, wherein the first group of systems are associated with the first and second layers and support the first service at both the first and second layers, display a list of the first group of systems associated with the first service, receive a selection of a first system from the list of the first group of systems and a selection of a second system from the list of the first group of systems, display a graphical representation of the first service, display a graphical representation of the first system and a graphical representation of the second system, monitor a performance of the first system and a performance of the second system, display the performance of the first system with the graphical representation of the first system and the performance of the second system with the graphical representation of the second system, receive a selection of a second service from the list of the plurality of communication services, display a list of a second group of systems associated with the second service, receive a selection of a third system from the list of the second group of systems, display a graphical representation of the second service, display a graphical representation of the third system, monitor a performance of the third system, and display the performance of the third system with the graphical representation of the third system.

8. The software product of claim 7 wherein the instructions, when executed by the computer system, direct the computer system to display the list of the first group of systems associated with the first service in response to the selection of the first service from the list of the plurality of communication services.

9. The software product of claim 7 wherein the instructions to process the selection of the first service to determine which of the plurality of layers are associated with the first service comprises instructions that direct the computer system to process a data structure that describes the communication services, the plurality of layers, and the plurality of systems.

10. The software product of claim 7 wherein the plurality of layers comprises a customer access layer, a network access layer, a service layer, and a support layer.

11. The software product of claim 7 wherein the instructions, when executed by the computer system, direct the computer system to display the list of the first group of systems associated with the first service in response to the selection of the first layer from the list of the plurality of layers.

12. The software product of claim 7 wherein the plurality of communication services comprise a voice service, a video service, and a data service.

13. A computer system for monitoring a service network having a plurality of layers to provide a plurality of communication services to customers, wherein the service network comprises a plurality of systems and each system of the plurality of systems is associated with one layer of the plurality of layers, the computer system comprising:

a user interface configured to display a list of the plurality of communication services provided to the customers, receive a selection of a first service from the list of the plurality of communication services, responsive to receiving the selection of the first service, process the selection of the first service to determine which of the plurality of layers are associated with the first service, display a list of a plurality of layers associated with the first service, receive a selection of a first layer from the list of the plurality of layers associated with the first service, receive a selection of a second layer from the list of the plurality of layers associated with the first service, process the selections of the first and second layers to determine a first group of systems of the plurality of systems, wherein the first group of systems are associated with the first and second layers and support the first service at both the first and second layers, display a list of a first group of systems associated with the first service, receive a selection of a first system from the list of the first group of systems and a selection of a second system from the list of the first group of systems, display a graphical representation of the first service, display a graphical representation of the first system and a graphical representation of the second system, display a performance of the first system with the graphical representation of the first system and a performance of the second system with the graphical representation of the second system, receive a selection of a second service from the list of the plurality of communication services, display a list of a second group of systems associated with the second service, receive a selection of a third system from the list of the second group of systems, display a graphical representation of the second service, display a graphical representation of the third system, and display a performance of the third system with the graphical representation of the third system; and a processing system configured to monitor the performance of the first system, the performance of the second system, and the performance of the third system.

* * * * *